US011271651B2

(12) United States Patent
Bao et al.

(10) Patent No.: US 11,271,651 B2
(45) Date of Patent: Mar. 8, 2022

(54) REMOTE RADIO UNIT AND A CENTRAL UNIT FOR A BASE TRANSCEIVER STATION

(71) Applicant: Huawei Technologies Co., Ltd., Shenzhen (CN)

(72) Inventors: Hongqiang Bao, Boulogne Billancourt (FR); Ganghua Yang, Shanghai (CN); Zhipeng Zhao, Munich (DE); Huijian Zhang, Boulogne Billancourt (FR); Ramin Khayatzadeh, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/105,304

(22) Filed: Nov. 25, 2020

(65) Prior Publication Data

US 2021/0083772 A1 Mar. 18, 2021

Related U.S. Application Data

(63) Continuation of application No. PCT/EP2018/063956, filed on May 28, 2018.

(51) Int. Cl.
*H04B 10/2575* (2013.01)
*H04B 10/58* (2013.01)
(Continued)

(52) U.S. Cl.
CPC ......... *H04B 10/2575* (2013.01); *H04B 10/40* (2013.01); *H04B 10/58* (2013.01); *H04W 88/085* (2013.01)

(58) Field of Classification Search
CPC .... H04B 10/2575; H04B 10/40; H04B 10/58; H04W 88/085
(Continued)

(56) References Cited

U.S. PATENT DOCUMENTS 5,263,033 A 11/1993 Seshadri
9,166,700 B2 * 10/2015 Gripp .................... H04J 14/021
(Continued)

FOREIGN PATENT DOCUMENTS

CN 102082752 A 6/2011
WO 2008030407 A2 3/2008

OTHER PUBLICATIONS

Hekkala et al., "Predistortion of Radio Over Fiber Links: Algorithms, Implementation, and Measurements"; IEEE Transactions on Circuits and Systems, vol. 59, No. 3, Mar. 2012 (Year: 2012).*
(Continued)

*Primary Examiner* — Dalzid E Singh
(74) *Attorney, Agent, or Firm* — Leydig, Voit & Mayer, Ltd.

(57) ABSTRACT

A remote radio unit is for a base transceiver station. The remote radio unit includes: a noise generator configured to provide a RF noise signal having predefined statistical properties; a communication interface configured to transmit the RF noise signal as a stimulus signal over a radio-over-fiber uplink channel between the remote radio unit and a central unit of the base transceiver station for determining a pre-distortion of a target signal to be transmitted by the remote radio unit. The communication interface is further configured to receive the pre-distorted target signal over a ROF downlink channel between the remote radio unit and the central unit of the base transceiver station. The remote radio unit also has an antenna for transmitting the pre-distorted target signal received by the communication interface.

16 Claims, 17 Drawing Sheets

(51) Int. Cl.
*H04W 88/08* (2009.01)
*H04B 10/40* (2013.01)

(58) Field of Classification Search
USPC .......................................................... 398/115
See application file for complete search history.

(56) References Cited

U.S. PATENT DOCUMENTS

| | | | |
|---|---|---|---|
| 2008/0063041 | A1 | 3/2008 | Galperin et al. |
| 2009/0232191 | A1* | 9/2009 | Gupta ................... H04B 10/40 375/216 |
| 2017/0093495 | A1* | 3/2017 | Lozhkin ................. H04J 14/08 |
| 2018/0076989 | A1 | 3/2018 | Lozhkin |
| 2018/0248626 | A1* | 8/2018 | Bruno .............. H04B 10/25753 |

OTHER PUBLICATIONS

Hekkala et al., "Architectures for Joint Compensation of RoF and PA with Nonideal Feedback," 2010 IEEE Vehicular Technology Conference, XP031696096, total 5 pages, Institute of Electrical and Electronics Engineers, New York, New York (May 2010).

Lopez-Valcarce et al., "Blind Equalization of Nonlinear Channels From Second-Order Statistics," IEEE Transactions on Signal Processing, vol. 49, No. 12, total 14 pages, Institute of Electrical and Electronics Engineers, New York, New York (Dec. 2001).

Hua et al., "Fast Maximum Likelihood for Blind Identification of Multiple FIR Channels," IEEE Transactions on Signal Processing, vol. 44, No. 3, pp. 661-672, Institute of Electrical and Electronics Engineers, New York, New York (Mar. 1996).

Giannakis et al., "Linear Multichannel Blind Equalizers of Nonlinear FIR Volterra Channels," IEEE Transactions on Signal Processing, vol. 45, No. 1, pp. 67-81, Institute of Electrical and Electronics Engineers, New York, New York (Jan. 1997).

Gesbert et al., "On-Line Blind Multichannel Equalization Based on Mutually Referenced Filters," IEEE Transactions on Signal Processing, vol. 45, No. 9, pp. 2307-2317, Institute of Electrical and Electronics Engineers, New York, New York (Sep. 1997).

Hekkala et al.,"Predistortion of Radio Over Fiber Links: Algorithms, Implementation, and Measurements," IEEE Transactions on Circuits and Systems-I: Regular Papers, vol. 59, No. 3, pp. 664-672, Institute of Electrical and Electronics Engineers, New York, New York (Mar. 2012).

Mayyala et al., "Structure-Based Subspace Method for Multichannel Blind System Identification," IEEE Signal Processing Letters, vol. 24, No. 8, pp. 1183-1187, Institute of Electrical and Electronics Engineers, New York, New York (Aug. 2017).

\* cited by examiner

REMOTE RADIO UNIT AND A CENTRAL UNIT FOR A BASE TRANSCEIVER STATION

CROSS-REFERENCE TO RELATED APPLICATIONS

This application is a continuation of International Application No. PCT/EP2018/063956, filed on May 28, 2018, the disclosure of which is hereby incorporated by reference in its entirety.

FIELD

In general, the present disclosure relates to the field of wireless communications. More specifically, the present disclosure relates to a remote radio unit and a central unit of a base transceiver station coupled by a radio-over-fiber link, as well as corresponding methods.

BACKGROUND

One of the major transmission solutions for high-bandwidth wireless communication systems is based on optical for the transmission of radio signals between the central unit and the remote radio unit (RRU) of a base transceiver station ("base station"). Such a communication system is generally referred to as a radio over fiber (RoF) system. In a RoF system, the radio signal is used for modulating the intensity of an optical carrier. FIG. 1 shows a simplified diagram of a conventional RoF link or system, i.e. base transceiver station 100, where the radio signal is converted into an optical signal by the RoF transceiver of the central unit 130 comprising an electronic-to-optical (EO) converter. The optical signal is transmitted through the fiber 120 and detected by another RoF transceiver at the remote radio unit 110, where an optical-to-electronic (OE) converter recovers the original RF signal, which is amplified and transmitted by the antenna of the RRU. This technique of transmitting the RF signals using an optical carrier over the fiber has numerous advantages over the conventional cooper wire solutions, such as low attenuation loss, large bandwidth, and reduced power consumption to name a few.

There are two main types of RoF communications systems, namely analog RoF systems and digital or digitized RoF systems.

FIG. 1 shows a conventional analog RoF system comprising a RRU 110 and a central unit 130 coupled by a RoF link 120. In the exemplary analog RoF system shown in FIG. 1, the RRU 110 just comprises a ROF transceiver or communication interface and a power amplifier (PA). The ADC (Analog to Digital Converter) and DAC (Digital to Analog Converter) are provided in the central unit 130 (together with a DSP—digital signal processing—unit and a ROF transceiver).

FIG. 2 shows a conventional digital RoF system 200, where the ADC and DAC are provided in the RRU 210 instead of the central unit 230, which increases the hardware complexity of the RRU 210. In large size deployments, such as massive MIMO (multiple input multiple output) millimeter wave applications, many channels are put into one RRU (for example, 64 antennas in one RRU for massive MIMO, which means 64 RoF, 64 PA and other accessories, such as filter and the like, are also inside the RRU). This substantially increases the size of the RRU and, thus, makes it difficult to deploy in practice.

One of the main challenges of analog RoF systems is to increase the system linearity for long distance transmission (e.g. the chromatic dispersion effect in a 20 Km fiber), as illustrated by the following simple application scenario: OFDM (orthogonal frequency division multiplexing) baseband width 200 MHz; radio frequency 3.5 GHz; fiber length 20 Km; directly modulated lasers (DML); a single fiber for a single RF channel, where the downlink optical wavelength is 1550 nm and the uplink wavelength is 1310 nm. For this simple application scenario, the single link performance ACPR (adjacent channel power ratio) may be reduced by 7-9 dBc because of the combined effect of laser chirp and optical fiber dispersion.

There have been some attempts to address the problems of analog RoF systems for long transmission distances and to increase the whole system performance with a few additional hardware components and optimized algorithms.

For instance, it has been proposed to use traditional digital pre-distortion for downlink nonlinearity compensation. A post-distorter can improve the uplink performance, but a training signal is needed as well, which, in turn, increases the complexity of the remote ratio unit, for instance, in terms of hardware. The training signal is required for compensating the nonlinearity of the RoF uplink, because otherwise it will result in a collapse of the performance (see Atso Hekkala et al: "Architectures for Joint Compensation of RoF and PA with Nonideal Feedback" Vehicular Technology Conference (VTC 2010-Spring), 2010 IEEE 71st May 2010; and Atso Hekkala et al: "Predistortion of Radio Over Fiber Links: Algorithms, Implementation, and Measurements", IEEE TRANSACTIONS ON CIRCUITS AND SYSTEMS—I: REGULAR PAPERS, VOL. 59, NO. 3, MARCH 2012. PP 672-674).

The training signal is usually in the digital baseband. If the baseband in the RRU is increased, a RF transceiver, a DAC and other components have to be added to the RRU, which will again increase the size of the RRU and, thus, might render such a RRU impractical for an actual deployment.

As shown in FIG. 3, in a conventional ROF system, the training signal is added by a training signal module 111 of the RRU 110, and an algorithm implemented in the central unit 130a is used to identify the uplink channel 120b. FIG. 4 illustrates the training signal 111 module for generating the conventional training signal used in the system shown in FIG. 3 in more detail. Typically, the training signal generation in the RRU 110 is realized by a digital baseband signal generator 111a, a DAC 111c, a RF modulator 111d, whose frequency is synchronized with the demodulation frequency at the central unit 130, a digital upconverter (DUC) 111b, and a synchronizing unit (Syn) for synchronizing the carrier. As will be appreciated, all of these components will add to the cost, size and weight of the conventional RRU 110.

Thus, the inventors have recognized that there is a need to provide an improved remote radio unit and an improved central unit for a base transceiver station.

SUMMARY

The disclosure provides an improved remote radio unit and an improved central unit for a base transceiver station.

Generally, embodiments of the present disclosure are based on the idea to use a noise generator for generating a stimulus signal having known statistical properties at the RRU side and to apply blind identification/equalization on the uplink ROF channel. To this end, in embodiments of the present disclosure, SOS-based blind equalization is performed. Embodiments of the present disclosure provide the necessary architecture for allowing both linear and nonlinear blind equalization. According to further embodiments of the present disclosure a power control unit is introduced in the RRU to make the system robust and adaptive in a real environment.

More specifically, according to a first aspect, the disclosure relates to a remote radio unit, RRU, for a base transceiver station. The remote radio unit comprises: a noise generator configured to provide a radio-frequency, RF, noise signal having predefined statistical properties, in particular second-order statistics and/or higher-order statistics; a communication interface configured to transmit, to a central unit of the base transceiver station, the RF noise signal as a stimulus (or excitation) signal over a radio-over-fiber, ROF, uplink channel between the remote radio unit and the central unit of the base transceiver station, wherein the communication interface is further configured to receive, from the central unit, a pre-distorted target signal over a ROF downlink channel between the remote radio unit and the central unit of the base transceiver station; and an antenna configured to transmit the pre-distorted target signal received via the communication interface.

Thus, a compact RRU is provided addressing the problems of conventional analog RoF systems for long transmission distances.

In a further possible implementation form of the first aspect, the noise generator is configured to provide the noise signal as a RF white noise signal having predefined statistical properties.

In a further possible implementation form of the first aspect, the remote radio unit further comprises a power amplifier configured to amplify the pre-distorted target signal received by the communication interface.

In a further possible implementation form of the first aspect, the remote radio unit further comprises a coupler configured to couple a ROF downlink channel processing chain of the remote radio unit to a ROF uplink channel processing chain of the remote radio unit.

In a further possible implementation form of the first aspect, the remote radio unit further comprises a controller configured to provide a control signal for triggering the noise generator to provide the RF noise signal.

In a further possible implementation form of the first aspect, the remote radio unit further comprises a power splitter configured to split the stimulus signal into a first stimulus signal and a second stimulus signal, wherein the communication interface is configured to transmit the first stimulus signal over the radio-over-fiber, ROF, uplink channel between the remote radio unit and the central unit of the base transceiver station and to transmit the second stimulus signal over a further radio-over-fiber, ROF, uplink channel between the remote radio unit and the central unit of the base transceiver station.

In a further possible implementation form of the first aspect, the remote radio unit further comprises a first local power control unit, in particular automatic gain controller (AGC), configured to control the power of the first stimulus signal to be transmitted over the radio-over-fiber, ROF, uplink channel between the remote radio unit and the central unit of the base transceiver station and a second local power control unit, in particular automatic gain controller (AGC), configured to control the power of the second stimulus signal to be transmitted over the further radio-over-fiber, ROF, uplink channel between the remote radio unit and the central unit of the base transceiver station.

In a further possible implementation form of the first aspect, the remote radio unit further comprises a global power controller configured to control the power of the first stimulus signal and the second stimulus signal by implementing an uplink ROF power control loop.

In a further possible implementation form of the first aspect, the communication interface is configured to receive a desired target gain from the central unit and the global power controller is configured to control the power of the first stimulus signal and the second stimulus signal by implementing an uplink ROF power control loop on the basis of the desired target gain. The desired target gain can be determined by the central unit such that the uplink RoF still operates in the linear regime, for instance, on the basis of the CDF (Cumulative Density Function) or CCDF (Complementary Cumulative Density Function) of the received signal.

In a further possible implementation form of the first aspect, the communication interface is further configured to receive a control signal from the central unit of the base transceiver station for triggering the noise generator to provide the RF noise signal.

According to a second aspect, the disclosure relates to a central unit for a base transceiver station. The central unit comprises: a communication interface configured to receive a RF, from a remote radio unit of the base transceiver station, noise signal as a stimulus (or excitation) signal over a radio-over-fiber, ROF, uplink channel between the central unit and the remote radio unit of the base transceiver station; and a pre-distortion unit configured to pre-distort a target signal to be transmitted by the remote radio unit on the basis of the RF noise signal received by the communication interface and information about the predefined statistical properties, in particular second-order statistics and/or higher-order statistics, of the RF noise signal. The communication interface is further configured to transmit the pre-distorted target signal over a ROF downlink channel to the remote radio unit of the base transceiver station.

In a further possible implementation form of the second aspect, the pre-distortion unit is configured to pre-distort the target signal to be transmitted by the remote radio unit on the basis of the RF noise signal received by the communication interface using a blind channel identification algorithm.

In a further possible implementation form of the second aspect, the blind channel identification algorithm is a constant modulus algorithm, CMA.

In a further possible implementation form of the second aspect, the central unit further comprises a control unit configured to provide a control signal, wherein the communication interface is further configured to transmit the control signal to the remote radio unit for triggering a noise generator of the remote radio unit to provide the RF noise signal.

In a further possible implementation form of the second aspect, the central unit further comprises an analog-to-digital converter and/or a digital-to-analog converter, wherein the pre-distortion unit is configured to pre-distort the target signal in the digital domain, i.e. in the base-band.

According to a third aspect, the disclosure relates to a base transceiver station comprising one or more remote radio units according to the first aspect of the disclosure, a central unit according to the second aspect of the disclosure and one or more optical fibers connecting the one or more remote radio units with the central unit.

According to a fourth aspect, the disclosure relates to a method of operating a remote radio unit of a base transceiver station. The method comprises the steps of: providing a RF noise signal having predefined statistical properties, in particular second-order statistics and/or higher-order statistics; transmitting the RF noise signal as a stimulus signal over a radio-over-fiber, ROF, uplink channel between the remote radio unit and a central unit of the base transceiver station; receiving a pre-distorted target signal over a ROF downlink channel between the remote radio unit and the central unit of the base transceiver station; and transmitting the pre-distorted target signal using an antenna of the remote radio unit.

The method according to the fourth aspect of the disclosure can be performed by the remote radio unit according to the first aspect of the disclosure. Further features of the method according to the fourth aspect of the disclosure result directly from the functionality of the remote radio unit according to the first aspect of the disclosure and its different implementation forms described above and below.

According to a fifth aspect, the disclosure relates to a method of operating a central unit of a base transceiver station. The method comprises: receiving a RF noise signal as a stimulus signal over a radio-over-fiber, ROF, uplink channel between the central unit and a remote radio unit of the base transceiver station; pre-distorting a target signal to be transmitted by the remote radio unit on the basis of the RF noise signal and information about the predefined statistical properties, in particular second-order statistics and/or higher-order statistics, of the RF noise signal; and transmitting the pre-distorted target signal over a ROF downlink channel to the remote radio unit of the base transceiver station.

The method according to the fifth aspect of the disclosure can be performed by the central unit according to the second aspect of the disclosure. Further features of the method according to the fifth aspect of the disclosure result directly from the functionality of the central unit according to the second aspect of the disclosure and its different implementation forms described above and below.

According to a sixth aspect, the disclosure relates to a computer program product comprising program code for performing the method of the fourth aspect and/or the method of the fifth aspect when executed on a computer or a processor.

The disclosure can be implemented in hardware and/or software.

BRIEF DESCRIPTION OF THE DRAWINGS

Further embodiments of the disclosure will be described with respect to the following figures, wherein.

In the various figures, identical reference signs will be used for identical or at least functionally equivalent features.

DETAILED DESCRIPTION

In the following description, reference is made to the accompanying drawings, which form part of the disclosure, and in which are shown, by way of illustration, exemplary aspects in which the present disclosure may be placed. It will be appreciated that other aspects may be utilized and structural or logical changes may be made without departing from the scope of the present disclosure. The following detailed description, therefore, is not to be taken in a limiting sense, as the scope of the present disclosure is defined by the appended claims.

For instance, it will be appreciated that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures.

Moreover, in the following detailed description, as well as in the claims, embodiments with different functional blocks or processing units are described, which are connected with each other or exchange signals. It will be appreciated that the present disclosure covers embodiments as well, which include additional functional blocks or processing units that are arranged between the functional blocks or processing units of the embodiments described below.

Finally, it is understood that the features of the various exemplary aspects described herein may be combined with each other, unless specifically noted otherwise.

As will be described in more detail further below, embodiments of the disclosure are based on the idea to replace the training signal generator of a conventional RRU 110 by a noise generator for generating a stimulus signal having well-defined statistical properties as the uplink ROF input signal and to perform a blind channel identification algorithm at the central unit. Thus, advantageously, only the noise generator, preferably a diode noise generator, is necessary to generate the stimulus signal in a remote radio unit according to an embodiment.

Figure 5:
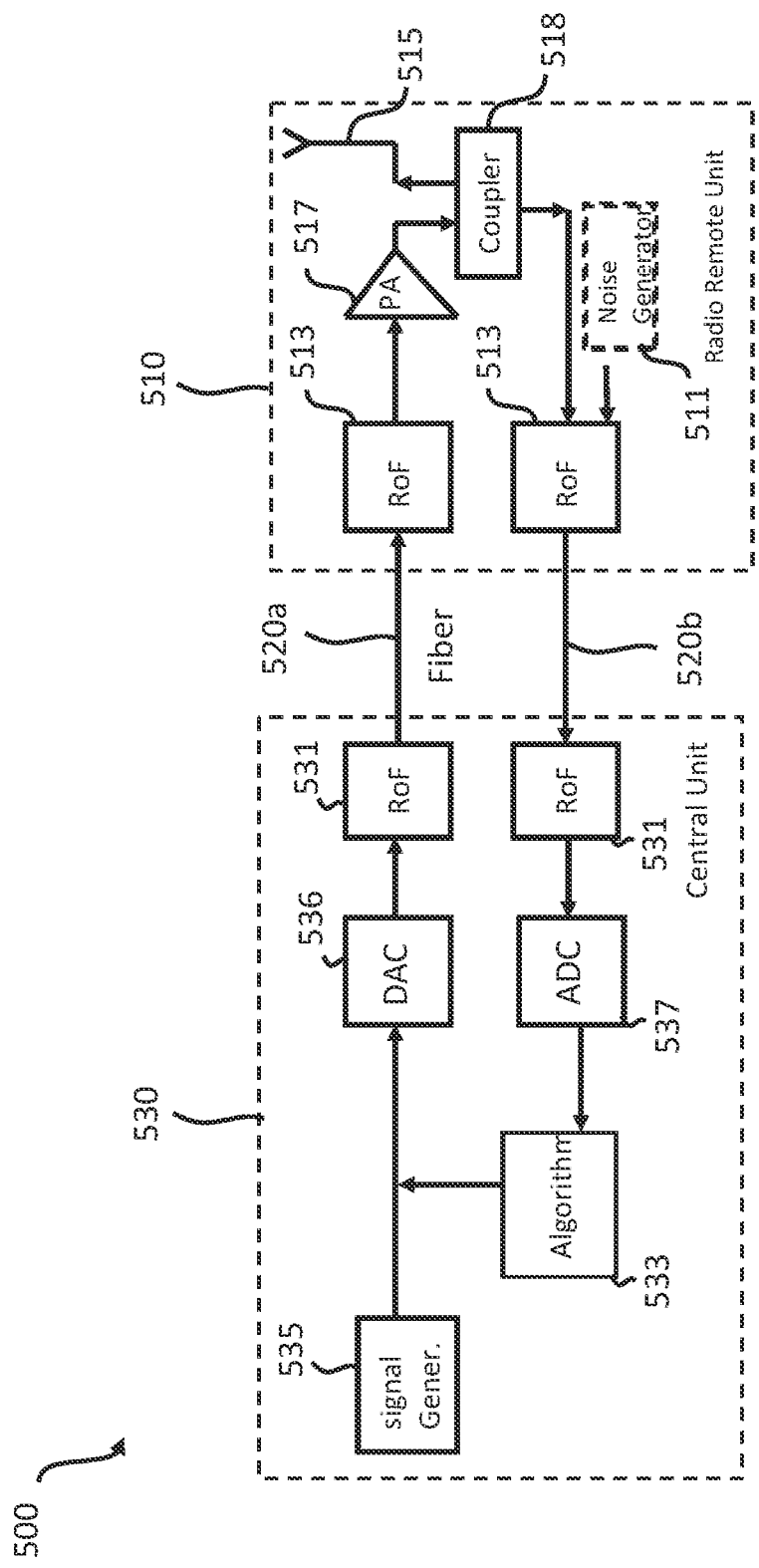
FIG. 5 shows a schematic diagram illustrating a base transceiver station including a remote radio unit according to an embodiment and a central unit according to an embodiment of the present disclosure.

FIG. 5 shows a schematic diagram illustrating a base transceiver station 500 including a remote radio unit (RRU) 510 according to an embodiment connected via and ROF downlink 520a and a ROF uplink 520b to a central unit 530 according to an embodiment. For the sake of clarity, only one RRU 510 is shown in FIG. 5. However, as will be appreciated, the base transceiver station 500 can comprise a plurality of remote radio units like the RRU 510 shown in FIG. 5, which are connected (by a respective plurality of ROF links) to one or more central units like the central unit 530 shown in FIG. 5.

The remote radio unit 510 comprises a noise generator 511 configured to provide a RF noise signal having predefined statistical properties, in particular second-order statistics and/or higher-order statistics. In an embodiment, the noise generator 511 is configured to provide a RF white noise signal having predefined statistical properties, in particular second-order statistics and/or higher-order statistics. In an embodiment, the noise generator 511 is a diode noise generator.

Moreover, the remote radio unit 510 comprises a communication interface 513 configured to transmit the RF noise signal as a stimulus signal over a radio-over-fiber, ROF, uplink channel 520b between the remote radio unit 510 and the central unit 530 of the base transceiver station 500 for determining on the basis of the RF noise signal a pre-distortion of a target signal to be transmitted by the remote radio unit 510. The communication interface 513 is further configured to receive the pre-distorted target signal over a ROF downlink channel 520a between the remote radio unit 510 and the central unit 530 of the base transceiver station 500.

Furthermore, the remote radio unit 510 comprises an antenna 515 for transmitting the pre-distorted target signal received by the communication interface 513.

The central unit 530 of the base transceiver station 500 comprises a communication interface 531 configured to receive the RF noise signal as a stimulus signal over the radio-over-fiber, ROF, uplink channel 520b between the central unit 530 and the remote radio unit 510 of the base transceiver station 500.

Moreover, the central unit 530 comprises a pre-distortion unit 533 implementing an algorithm configured to pre-distort the target signal to be transmitted by the remote radio unit 510 on the basis of the RF noise signal received by the communication interface 531 as well as information about the predefined statistical properties, in particular second-order statistics and/or higher-order statistics, of the RF noise signal. In an embodiment, this information about the pre-defined statistical properties of the RF noise signal can be retrieved from a memory of the central unit 530.

The communication interface 531 of the central unit 530 is further configured to transmit the pre-distorted target signal over the ROF downlink channel 520a to the remote radio unit 510 of the base transceiver station 500.

In an embodiment, the remote radio unit 510 further comprises a power amplifier 517 configured to amplify the pre-distorted target signal received by the communication interface 513 from the central unit 530.

As illustrated in FIG. 5, in an embodiment, the remote radio unit 510 further comprises a coupler 518 configured to couple a ROF downlink channel processing chain of the remote radio unit 510 (which, in the embodiment shown in FIG. 5 includes the downlink portion of the communication interface 513, the power amplifier 517 as well as the antenna 515) to a ROF uplink channel processing chain of the remote radio unit 510 (which, in the embodiment shown in FIG. 5, includes the noise generator 511 and the uplink portion of the communication interface 513).

Figure 12:
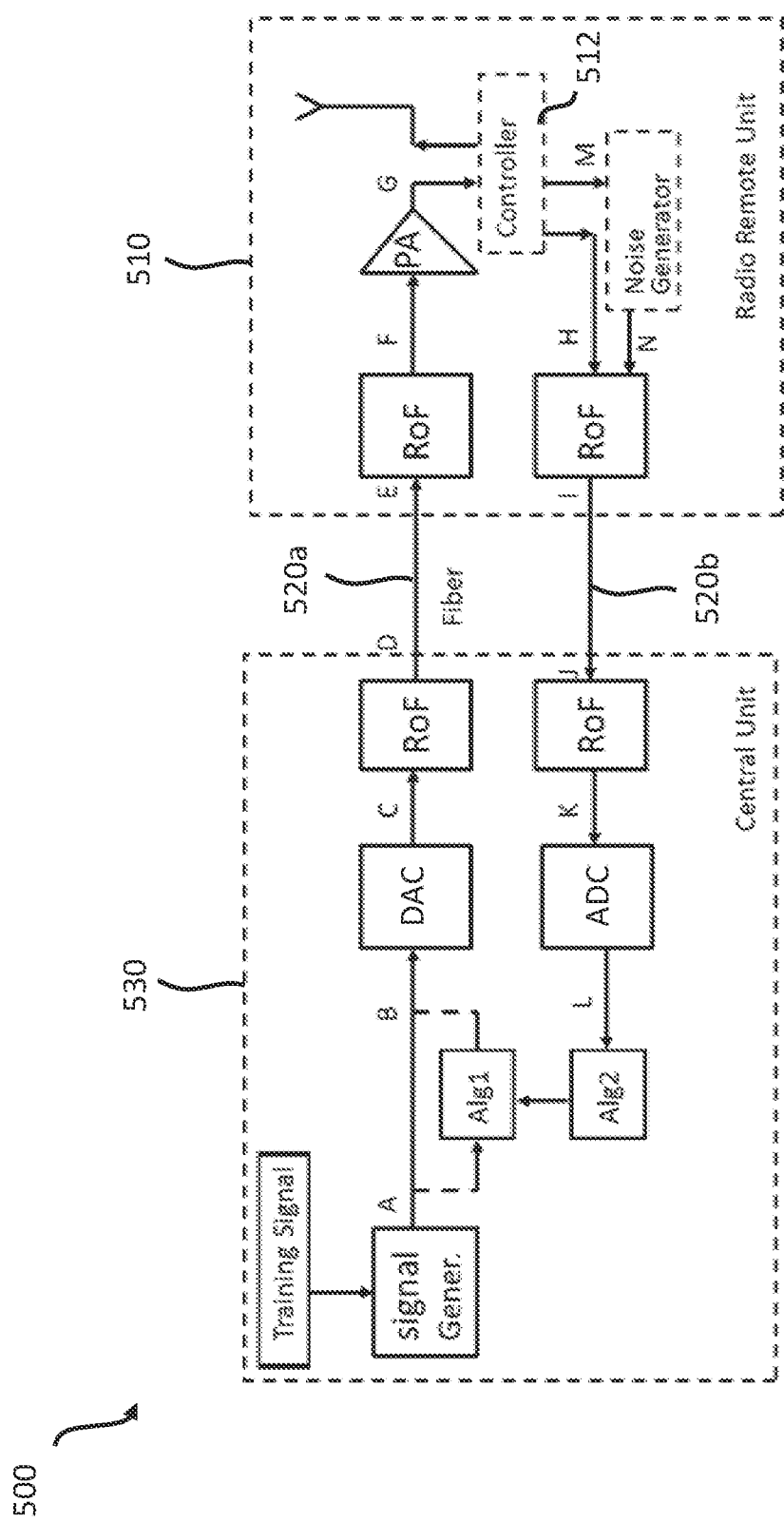
FIG. 12 shows a schematic diagram illustrating aspects of pre-distortion modeling as implemented in embodiments of the disclosure.

In an embodiment, the remote radio unit 510 further comprises a controller 512 configured to provide a control signal for triggering the noise generator 511 to provide the RF noise signal (shown in FIG. 12). Alternatively or additionally, the control signal for triggering the noise generator 511 can be provided by the central unit 530. Thus, in an embodiment, the communication interface 513 of the remote radio unit 510 is further configured to receive a control signal from the central unit 530 of the base transceiver station 500 for triggering the noise generator 511 to provide the RF noise signal. In an embodiment, the central unit 530 of the base transceiver station 500 further comprises a control unit configured to provide a control signal, wherein the communication interface 531 of the central unit 530 is configured to transmit the control signal to the remote radio unit 510 for triggering the noise generator 511 of the remote radio unit 510 to provide the RF noise signal.

As illustrated in FIG. 5, in an embodiment, the central unit 530 of the base transceiver station 500 further comprises an analog-to-digital converter 537 and/or a digital-to-analog converter 536, wherein the pre-distortion unit 533 is configured to pre-distort the target signal in the digital domain, i.e. in the base-band.

Figure 1:
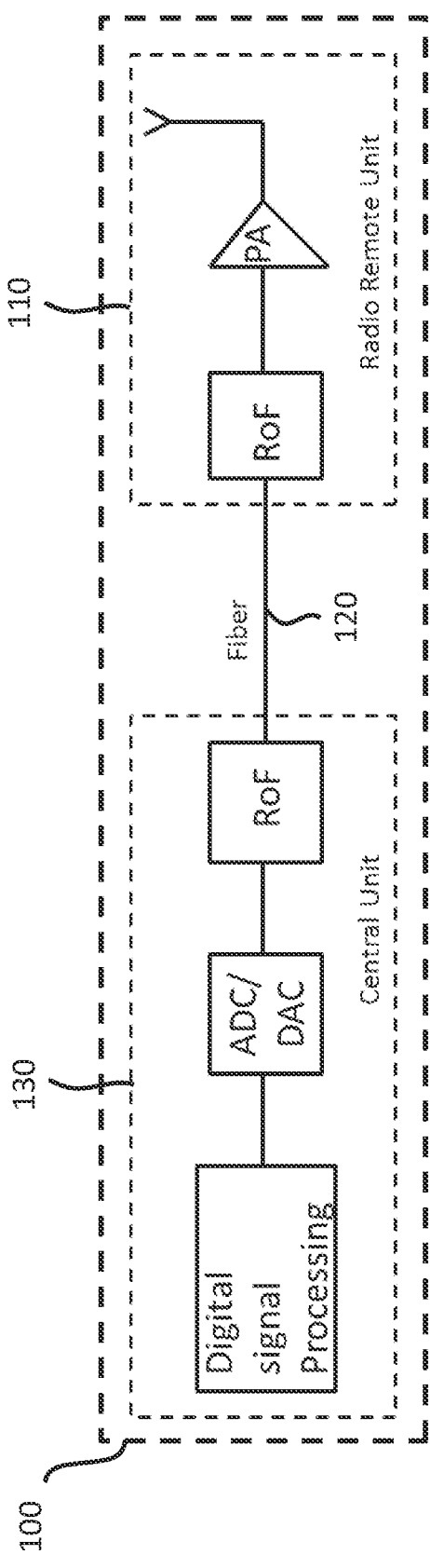
FIG. 1 shows a schematic diagram illustrating an analog RoF system.
Figure 2:
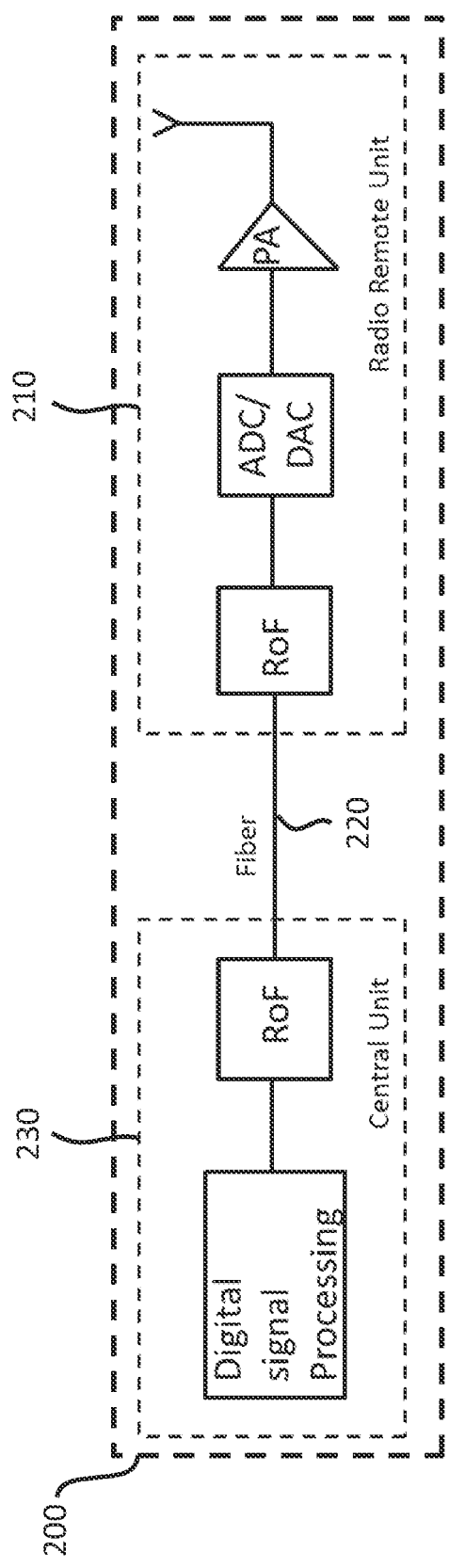
FIG. 2 shows a schematic diagram illustrating a digital RoF system.
Figure 3:
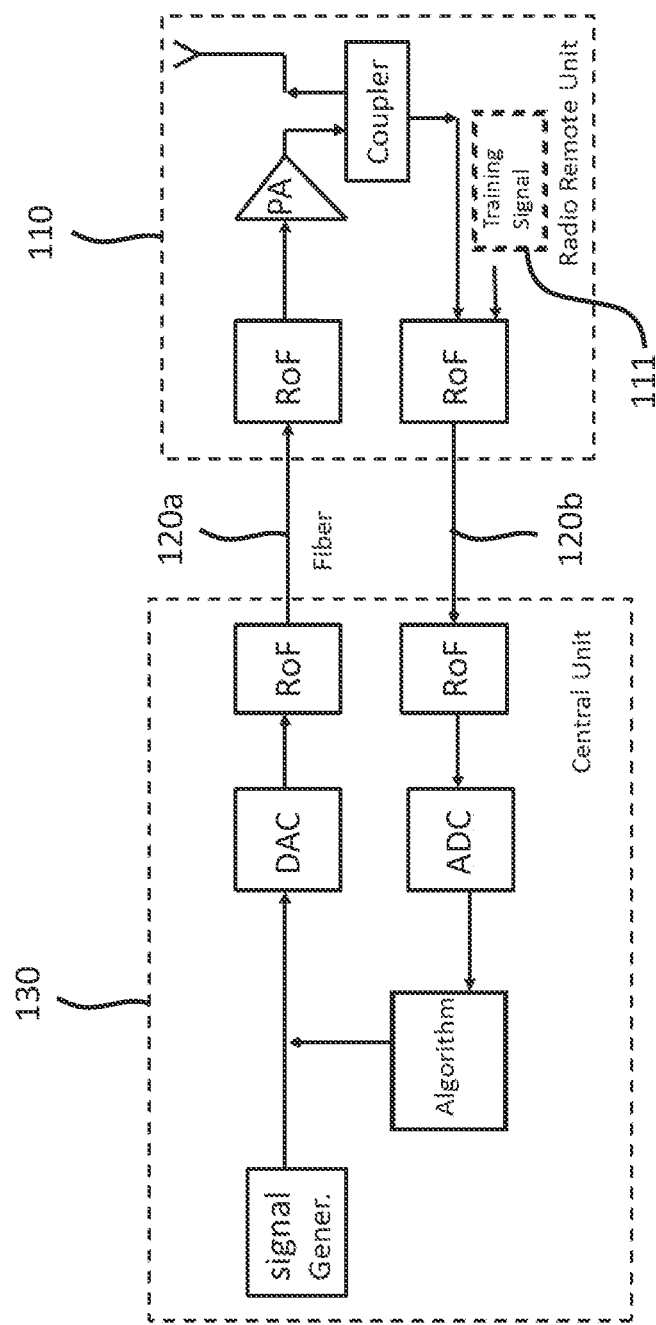
FIG. 3 shows a schematic diagram illustrating a RoF system using a conventional training signal for uplink non-linearity compensation.
Figure 4:
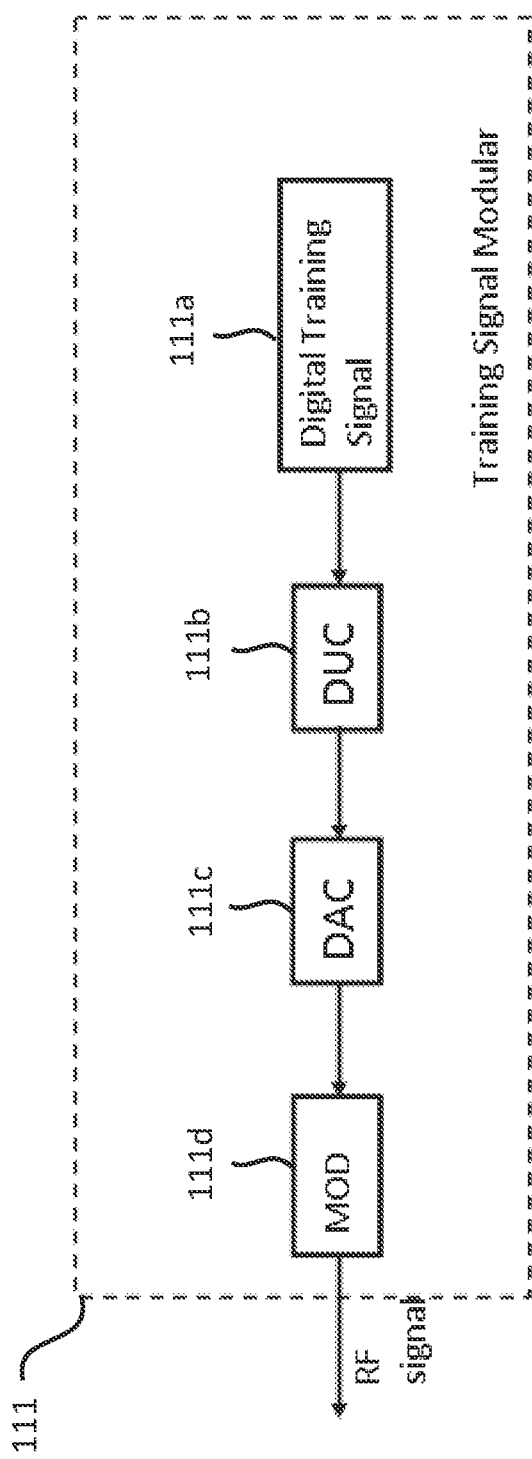
FIG. 4 shows a schematic diagram illustrating a training signal module for providing a conventional training signal.

As will be appreciated, the noise generator 511, such as diode noise generator, can be provided by a low cost element having a compact size, which is the only element necessary for providing the stimulus signal (contrary to the additional elements required by the conventional training signal module shown in FIG. 4). As mentioned, the uplink ROF channel 520b is then identified by the central unit 530 by applying the algorithm implemented in unit 533, in particular a blind channel identification algorithm, using the information about the predefined statistical properties, in particular second-order statistics (SOS) and/or higher-order statistics (HOS), of the RF noise signal, i.e. stimulus signal. These statistical properties of the stimulus signal are available to the central unit 530, as they are defined by physical properties of the noise generator 511.

In an embodiment, the central unit 530 can implement, for instance, the CMA (constant modulus algorithm), which requires HOS information and which minimizes the mean cost function $E\{\Psi(y(n))\}$:

$$\Psi(y(n))=(|y(n)2-R|)2 \text{ with } R=E\{|a(n)|4\}/E\{|a(n)|2\},$$

where y(n) denotes the equalized signal and a(n) denotes the input signal. Here, $E\{(|y(n)2-R|)2\}$ and $E\{|a(n)|4\}$ denote the 4th-order statistic (HOS) information, while $E\{|a(n)2\}$ denotes the $2^{nd}$-order statistic (SOS) information. However, this algorithm does not work with an input signal of Gaussian distribution: that suggests the HOS information cannot be exploited or only SOS information can be exploited. In other words, using the HOS information relies on a minimization of the cost function, which requires the ratio of the input signal's high-order statistic to the second-order statistic. This minimization will optimize the equalized signal's distribution (statistic) to approach the distribution of the input's signal. However, it can be proven that such optimization can be performed on a Gaussian signal. This is because the Gaussian signal after a linear channel will always remain a Gaussian signal, i.e. there is no difference in distribution.

Thus, in an embodiment, the pre-distortion unit 533 is configured to pre-distort the target signal to be transmitted by the remote radio unit 510 on the basis of the RF noise signal received by the communication interface 531 using a blind channel identification algorithm. As mentioned, in an embodiment, the blind channel identification algorithm is a constant modulus algorithm, CMA.

Figure 6:
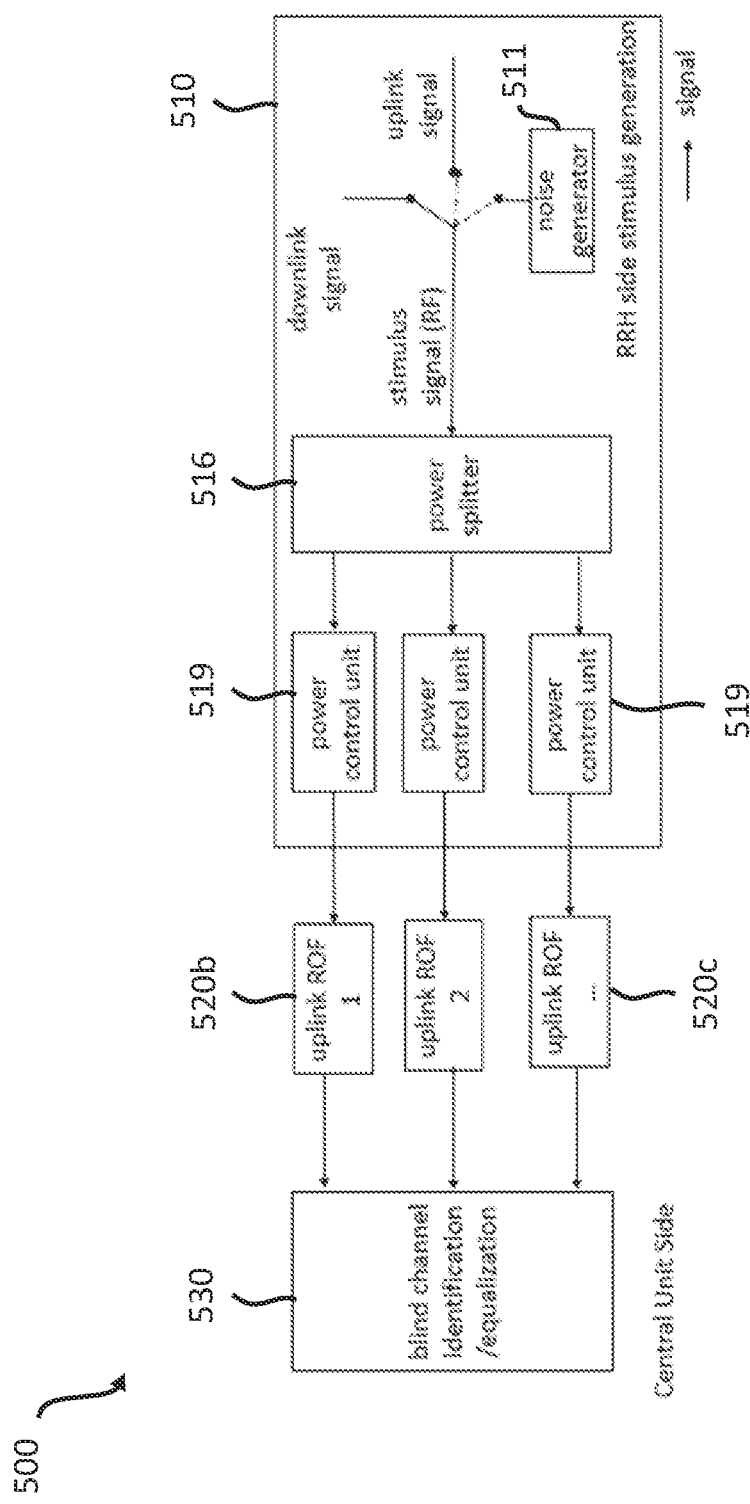
FIG. 6 shows a schematic diagram illustrating a base transceiver station including a remote radio unit according to an embodiment and a central unit according to an embodiment of the present disclosure.

According to further embodiments, the remote radio unit 510 and the central unit 530 of the base transceiver station 500 can implement a SIMO (single input multiple output) architecture, which will be described in more detail in the following under further reference to FIG. 6 and which is particular useful in massive MIMO scenarios. As illustrated in FIG. 6, the SIMO architecture can be natively supported by the RRU 510 according to an embodiment further comprising a power splitter 516 with a respective power control unit 519, such as an AGC (Automatic Gain Control) unit, for stabilizing the uplink ROF input power.

Thus, in an embodiment, the remote radio unit 510 further comprises a power splitter 516 configured to split the stimulus signal at least into a first stimulus signal and a second stimulus signal, wherein the uplink portion of the communication interface 513 is configured to transmit the first stimulus signal over the radio-over-fiber, ROF, uplink channel 520b between the remote radio unit 510 and the central unit 530 of the base transceiver station 500 and to transmit the second stimulus signal over a further radio-over-fiber, ROF, uplink channel 520c between the remote radio unit 510 and the central unit 530 of the base transceiver station 500.

In an embodiment, the remote radio unit 510 further comprises a first local power control unit 519, in particular automatic gain controller (AGC), configured to control the power of the first stimulus signal to be transmitted over the radio-over-fiber, ROF, uplink channel 520b between the remote radio unit 510 and the central unit 530 of the base transceiver station 500 and a second local power control unit 519, in particular automatic gain controller (AGC), configured to control the power of the second stimulus signal to be transmitted over the further radio-over-fiber, ROF, uplink channel 520c between the remote radio unit 510 and the central unit 530 of the base transceiver station 500.

In an embodiment, the remote radio unit 510 further comprises a global power controller 514 (illustrated in FIG. 15 and described in more detail further below) configured to control the power of the first stimulus signal and the second stimulus signal by implementing an uplink ROF power control loop. To this end, the downlink portion of the communication interface 513 of the RRU 510 can be configured to receive a desired target gain from the central unit 530 and the global power controller 514 can be configured to control the power of the first stimulus signal and the second stimulus signal by implementing an uplink ROF power control loop on the basis of the desired target gain. The desired target gain be determined by the central unit 530 such that the uplink RoF still operates in the linear regime, for instance, on the basis of a constant CDF (Cumulative Density Function) and/or a constant CCDF (Complementary Cumulative Density Function) of the received signal.

Thus, in an embodiment, the multiple ROF channels shown in FIG. 6 are supposed to be different from each other (diversity condition) and the SOS-based blind equalization algorithm taking advantage of such diversity can be applied by the central unit 530 for high accuracy and low complexity in both the linear scenario as well as the and non-linear scenario. According to embodiments of the disclosure, these types of algorithms do not require information about the statistical properties of the stimulus signal. Thus, in further embodiments of the disclosure, the noise generator 511 shown in FIG. 6 is not necessary and can be replaced by a different stable signal source, such as the downlink signal or the uplink signal.

Figure 7:
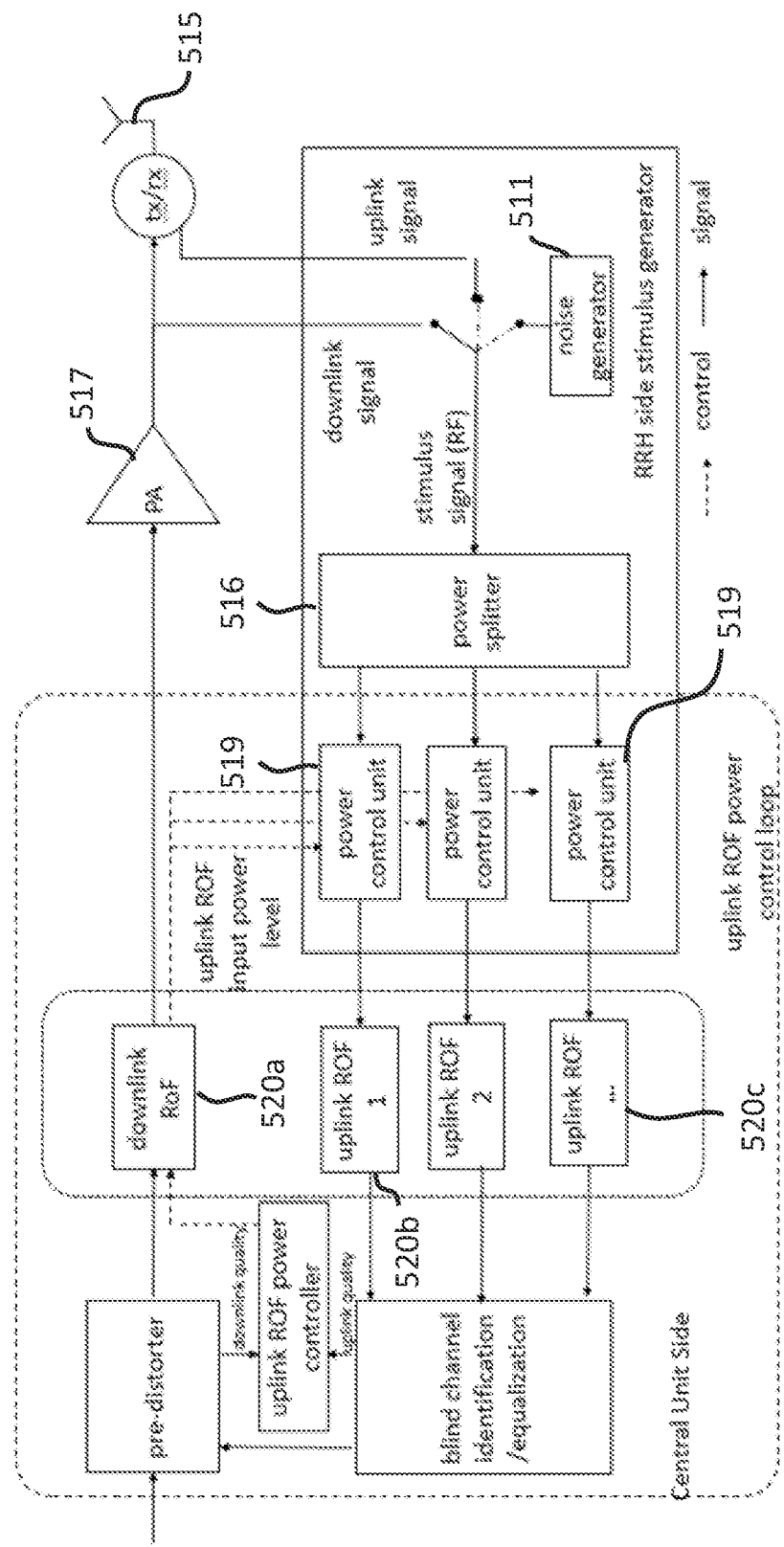
FIG. 7 shows a schematic diagram illustrating a base transceiver station including a remote radio unit according to an embodiment and a central unit according to an embodiment of the present disclosure.

As already described above, embodiments of the disclosure, one of which is illustrated in FIG. 7, provide an uplink ROF power control loop, which is based on the finding that the uplink ROF input signal power is a key factor for the quality of the channel identification for both the uplink 520b and the downlink 520a. Thus, embodiments of the disclosure provide a closed-loop power control architecture. This power control is executed by the RRU 510, while the power level, i.e. the target gain, is determined by the central unit 530. To this end, in an embodiment, the uplink signal quality and/or the downlink signal quality can be fed to the uplink ROF power control unit 519 as information, ex. MSE, EVM, SER or BER. In an embodiment, the RRU 510 and the central unit 530 are configured to implement the following scenario: for a given range of uplink ROF input signal power levels, execute at each power level the loop calibration, including uplink compensation (post-distortion) and downlink compensation (pre-distortion) then find the power level that yields the best downlink signal. More specifically, the respective power control unit 519 of the RRU 510 will follow the instructions on uplink ROF power level. The blind channel identification/equalization module of the central unit 530 can evaluate the equalized uplink signal's quality. The pre-distorter module of the central unit 530 can evaluate the equalized looped downlink signal's channel's quality. The uplink ROF power controller optimizes the uplink ROF power level based on the assessment of the UL/DL signal's quality.

In the following different aspects, further background and/or modifications of the embodiments shown in FIGS. 5, 6 and 7 will be described in more detail.

Figure 8:
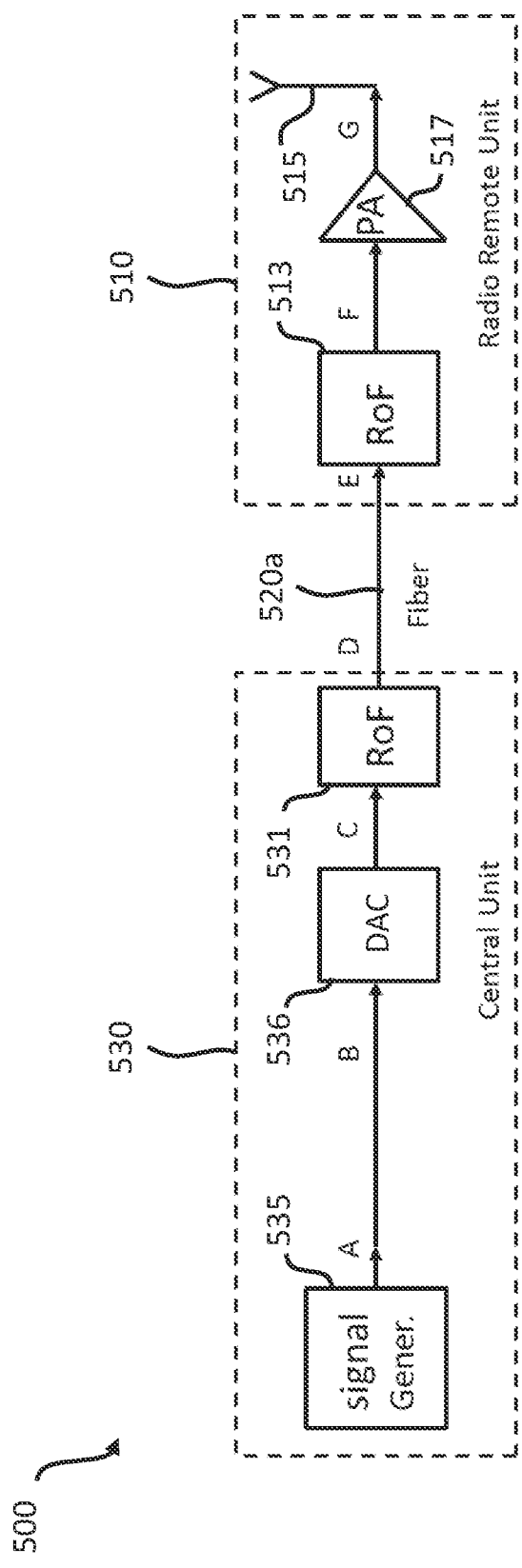
FIG. 8 shows a schematic diagram illustrating processing steps for the downlink transmission in a remote radio unit according to an embodiment and a central unit according to an embodiment of the present disclosure.

FIG. 8 illustrates the signal flow for a downlink transmission, where the signal flows from A to B, C, D, E, F, G, and then is emitted by the antenna 515. In an exemplary embodiment, the signal generator 535 of the central unit 530 generates a 200 MHz bandwidth OFDM baseband signal. In this case, the signal at A and B is the same for a 200 MHz bandwidth OFDM baseband digital signal. In the DAC 536, the signal is modulated to a 3.5 GHz frequency carrier, and then converted to an analog signal so that the output at C is an analog electronic signal with 3.5 GHz. In the downlink portion of the communication interface 531 (i.e. ROF unit), the electronic signal is modulated onto an optical carrier, whose wavelength is 1550 nm so that D and E are optical signals.

At the RRU 510 the downlink portion of the communication interface 513 converts the optical signal to an electronic signal, which is the inverse process of the process performed by the downlink portion of the communication interface 531 of the central unit 530. Thus, at F the signal is again an analog electronic signal with 3.5 GHz. As will be appreciated, under ideal channel conditions the signal at F would have the same shape as the signal at C. The power amplifier 517 of the RRU 510 is provided for signal energy amplification from F to G.

Figure 9:
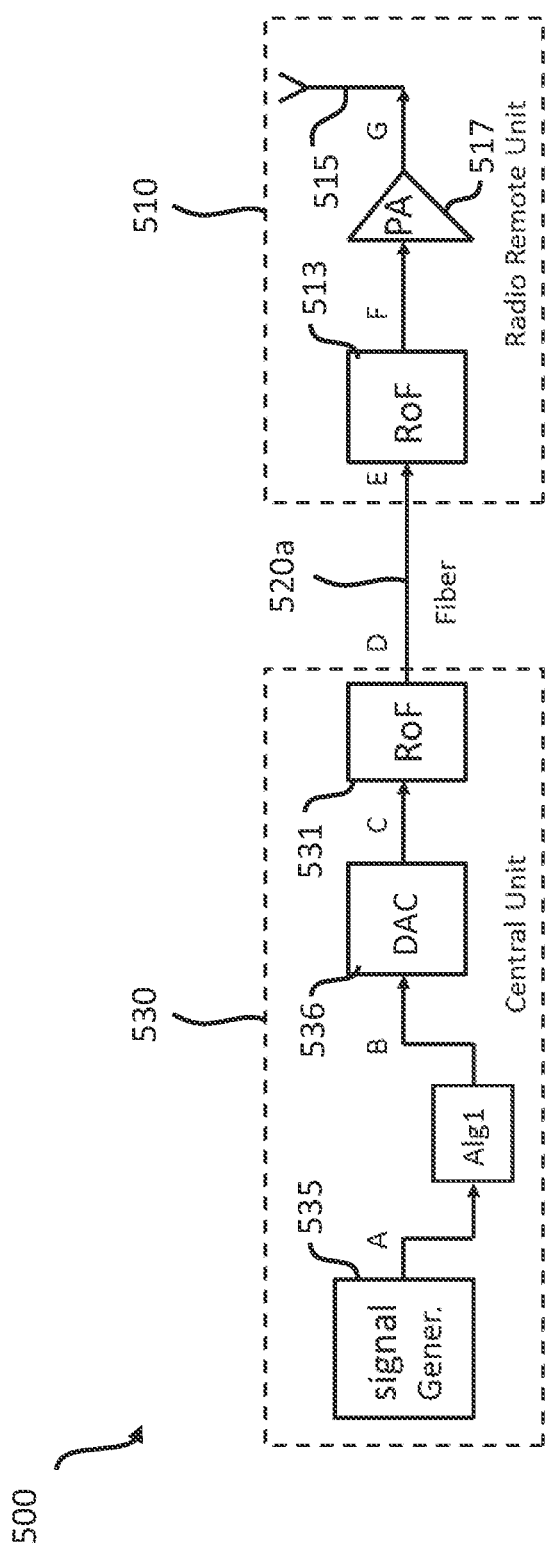
FIG. 9 shows a schematic diagram illustrating processing steps for the pre-distortion downlink transmission in a remote radio unit according to an embodiment and a central unit according to an embodiment of the present disclosure.
Figure 10:
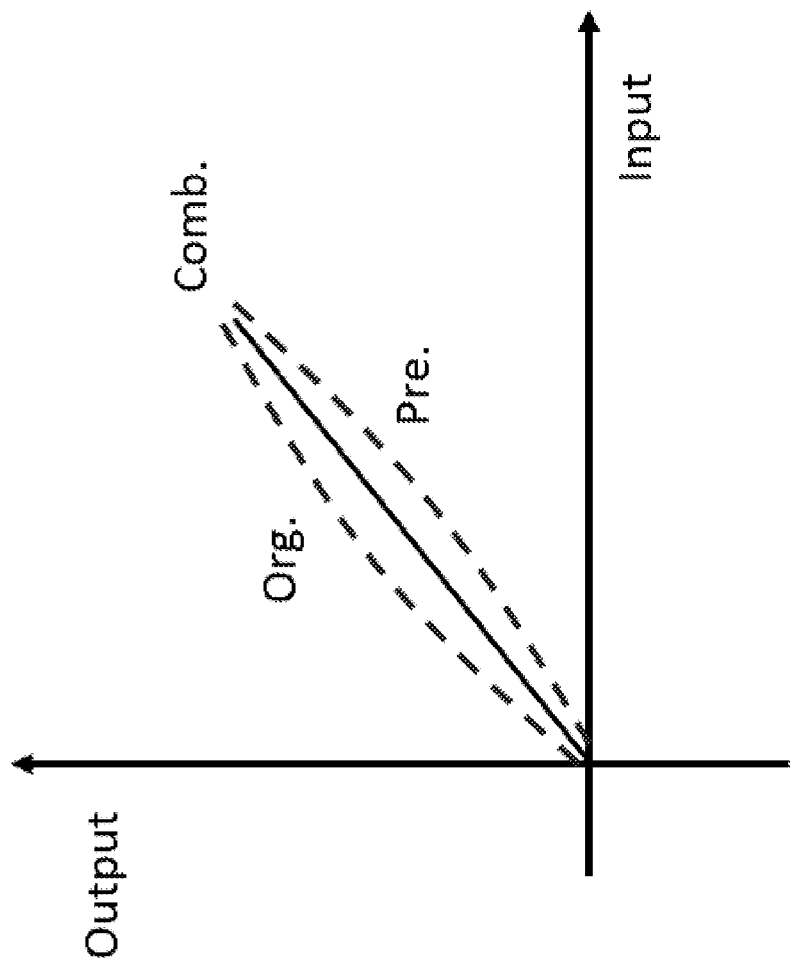
FIG. 10 shows a schematic diagram illustrating aspects of pre-distortion as implemented in embodiments of the disclosure.

As already described above in the context of the technical background of the present disclosure, for two long distance ROF links (e.g. fibers of lengths 10 to 20 Km), the power amplifier 518 can have nonlinearity features, which distort the signal and increase out-of-band energy. In the prior art, this distorted signal is very difficult to recover by the receiver. To overcome this issue, a digital pre-distortion algorithm may be implemented, which is referenced in FIG. 9 as "Alg1". Thus, in the implementation shown in FIG. 9, the signal flowing from A to B is distorted by the digital pre-distortion algorithm "Alg1", which counteracts the non-linearity features(s) of the power amplifier 517 mentioned above. This is illustrated in FIG. 10, where the original (Org) signal has the non-linearity feature, the pre-distortion (Pre) algorithm counteracts the non-linearity feature, and the final combined signal (Comb) will have the ideal linearity.

Figure 11:
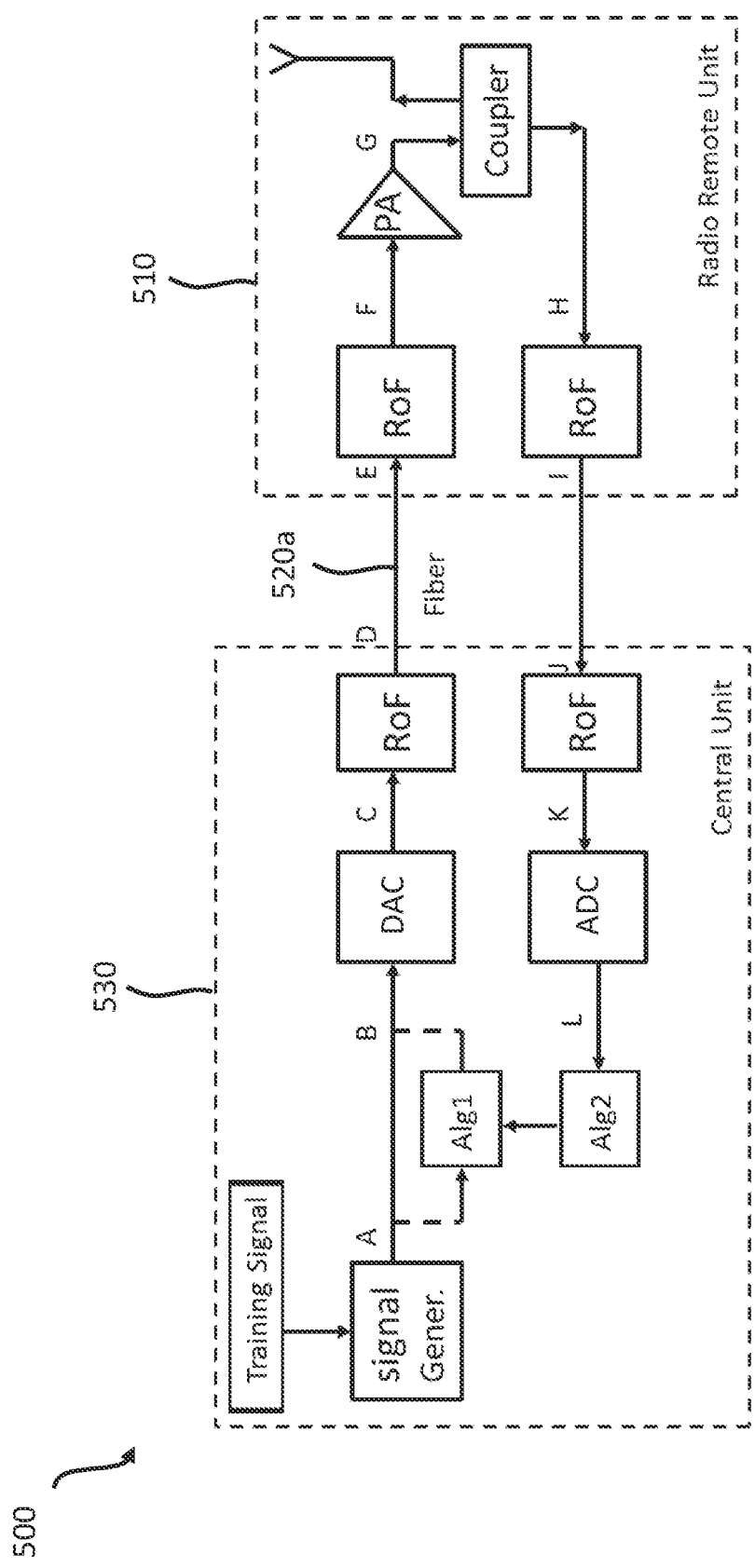
FIG. 11 shows a schematic diagram illustrating aspects of pre-distortion modeling as implemented in embodiments of the disclosure.

Thus, the pre-distortion algorithm can compensate any nonlinearities of the hardware modules. This, however, requires having information about the one or more nonlinearities introduced by a hardware module before designing any pre-distortion algorithm. This can be done using a training signal, as illustrated in FIG. 11. The training signal is generated by the signal generation unit 535 (or provided thereto) and flows from A, to B, C, D, E, F and G. The goal is to achieve the same signal nonlinearity at G and L. In other words, by means of the algorithm "Alg2" the whole nonlinearity model from A to G has to be represented and then pre-distorted by the algorithm "Alg1". In the case of very long distance fibers and an uplink and a downlink portion of the respective communication interfaces 531, 513 from H to K some nonlinearity is involved as well, which is, however, not needed in Alg2.

As already described above in the context of FIG. 5, the remote radio unit 510 according to an embodiment comprises a noise generator 511 configured to provide the stimulus signal as a RF noise signal having predefined statistical properties, in particular second-order statistics and/or higher-order statistics, known to the central unit 530. The corresponding signal flow is illustrated in FIG. 12. The stimulus signal flows from N, to I, J, K, and L. According to embodiments of the disclosure, the algorithm "Alg2" uses information about statistical properties of the stimulus signal, such as SOS information, to model uplink channel features. As already mentioned above, in an embodiment, the controller 512 of the RRU 510 can be configured to provide a control signal to the noise generator 511 (illustrated at M in FIG. 12) for triggering the noise generator 511.

Figure 13:
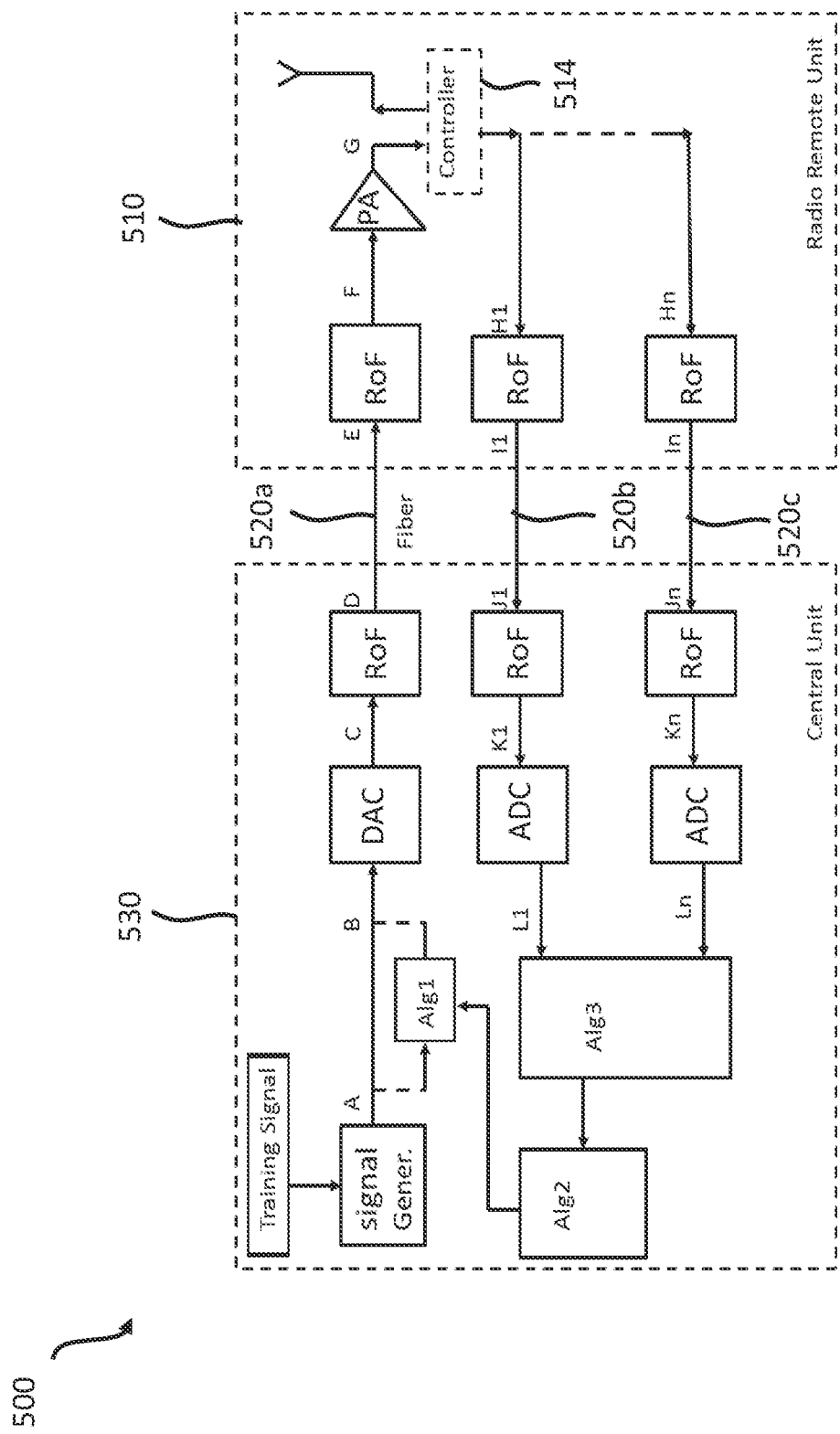
FIG. 13 shows a schematic diagram illustrating base transceiver station including a remote radio unit according to an embodiment and a central unit according to an embodiment of the present disclosure.

FIG. 13 illustrates the signal flow in the SIMO embodiments shown in FIGS. 6 and 7. As already described above, the SIMO embodiments are based on the idea to firstly describe the uplink channel feature and secondly compensate the uplink channel feature (as illustrated by the signal flow from H to L in FIG. 13). As used herein, SIMO means one downlink channel and at least two uplink channels. A simple SIMO embodiment, similar to the ones shown in FIGS. 6 and 7, is illustrated in FIG. 13. As already mentioned above in the context of FIGS. 6 and 7, in an embodiment, the RRU 510 can further comprise a respective power control unit 519, in particular, a respective Automatic Gain Controller (AGC) to control different gains for different uplink channels 520b,c. Advantageously, this allows to independently control the different uplink channels 520b,c and to observe the resulting differences by the algorithm "Alg3" implemented in the central unit 530.

A SIMO system can be identified under the following conditions: (i) all channels in the system must be different enough from each other; (ii) the input sequence must be complex enough; and (iii) enough output samples need to be available. As already mentioned above, in embodiments of the disclosure respective power control units 519 are implemented in the RRU 510 for adjusting the input power for every uplink channel, so that they can work differently. The training sequence provided by the central unit 510 can be arbitrarily complex and can be kept for sufficient time in order to obtain enough output samples for processing by the algorithm "Alg3".

In an embodiment, a two-steps maximum likelihood (TSML) algorithm can be implemented as algorithm "Alg3" in the central unit 530. Thus, if y denotes the received signal (vector) from multiple-channels, according to an embodiment the channel can be identified by using the following two-step ML algorithm:

$$\text{step one: } h_c = \underset{h}{\operatorname{argmin}}\, h^H Y^H Y h,\ \|h_c\| = 1$$

$$\text{step two: } h_e = \underset{h}{\operatorname{argmin}}\, h^H Y^H (G_c^H G_c)^\dagger Y h,\ \|h_e\| = 1$$

† denotes the pseudo-inversion operation wherein Y is generated from y, Gc is generated from hc such that:

$$G^H y = Y h$$

equalization:

$$s_{eq} = (H^H H)^{-1} H^H y$$

where H is the Sylvester matrix of h.

Figure 14:
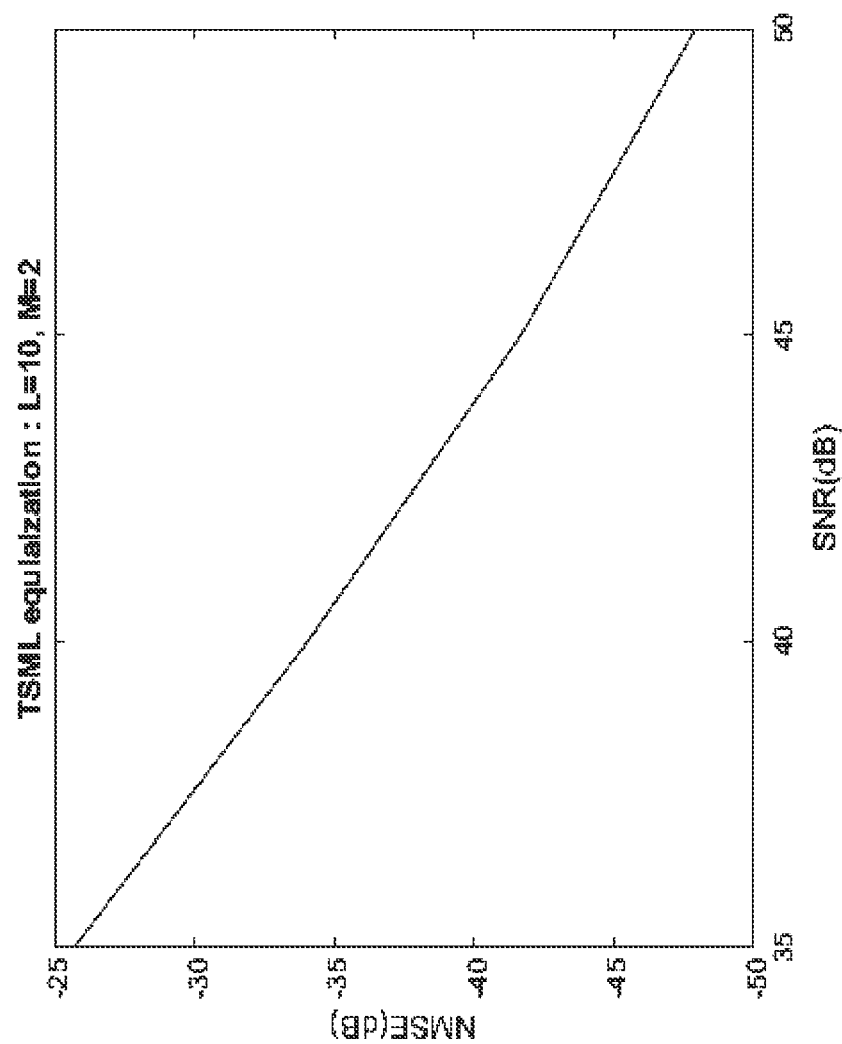
FIG. 14 shows a schematic diagram illustrating the performance of a remote radio unit according to an embodiment and a central unit according to an embodiment of the present disclosure.

The performance of the algorithm "Alg3" as a two-steps maximum likelihood (TSML) algorithm in the central unit 530 is illustrated in FIG. 14. The simulation result shown in FIG. 14 is for a linear SIMO system with 2 channels, wherein each channel has a length L=10 and the coefficients are randomly generated. NMSE stands for the normalized mean square error between the equalized signal and input signal. It is observed that a low NMSE can be achieved in the high SNR region.

Figure 15:
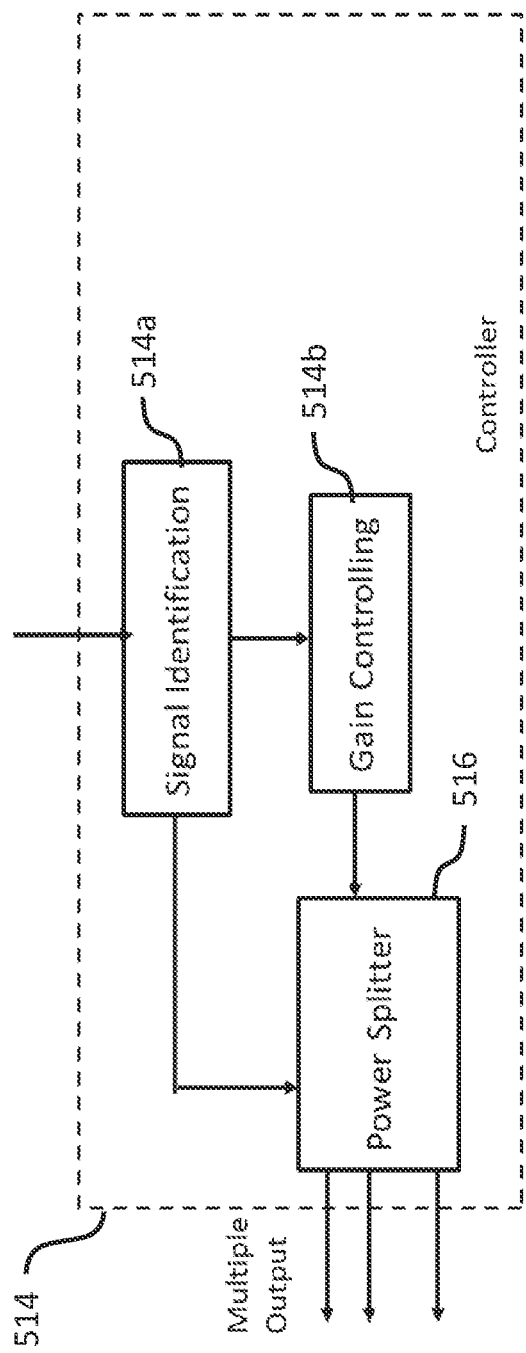
FIG. 15 shows a schematic diagram illustrating a controller of the remote radio unit according to an embodiment of the present disclosure.

FIG. 15 shows a schematic diagram illustrating in more detail the global power controller 514 of the remote radio unit 510 shown in FIG. 13. As already mentioned above, in an embodiment, the controller 514 can have three main functions. The signal identification module 514a of the controller 514 is configured to identify a received input signal. In case of a control signal the gain controlling module 514b will generate at a suitable time a gain control signal and send the gain control signal to the power splitter 516 for the different uplink channels 520b,c. The power splitter 516 of the controller 514 is configured to adjust the actual output power for the different uplink channels 520b,c. As will be appreciated, the controller 514 is capable of dealing with time-varying channels, for instance, by operating periodically.

Figure 16:
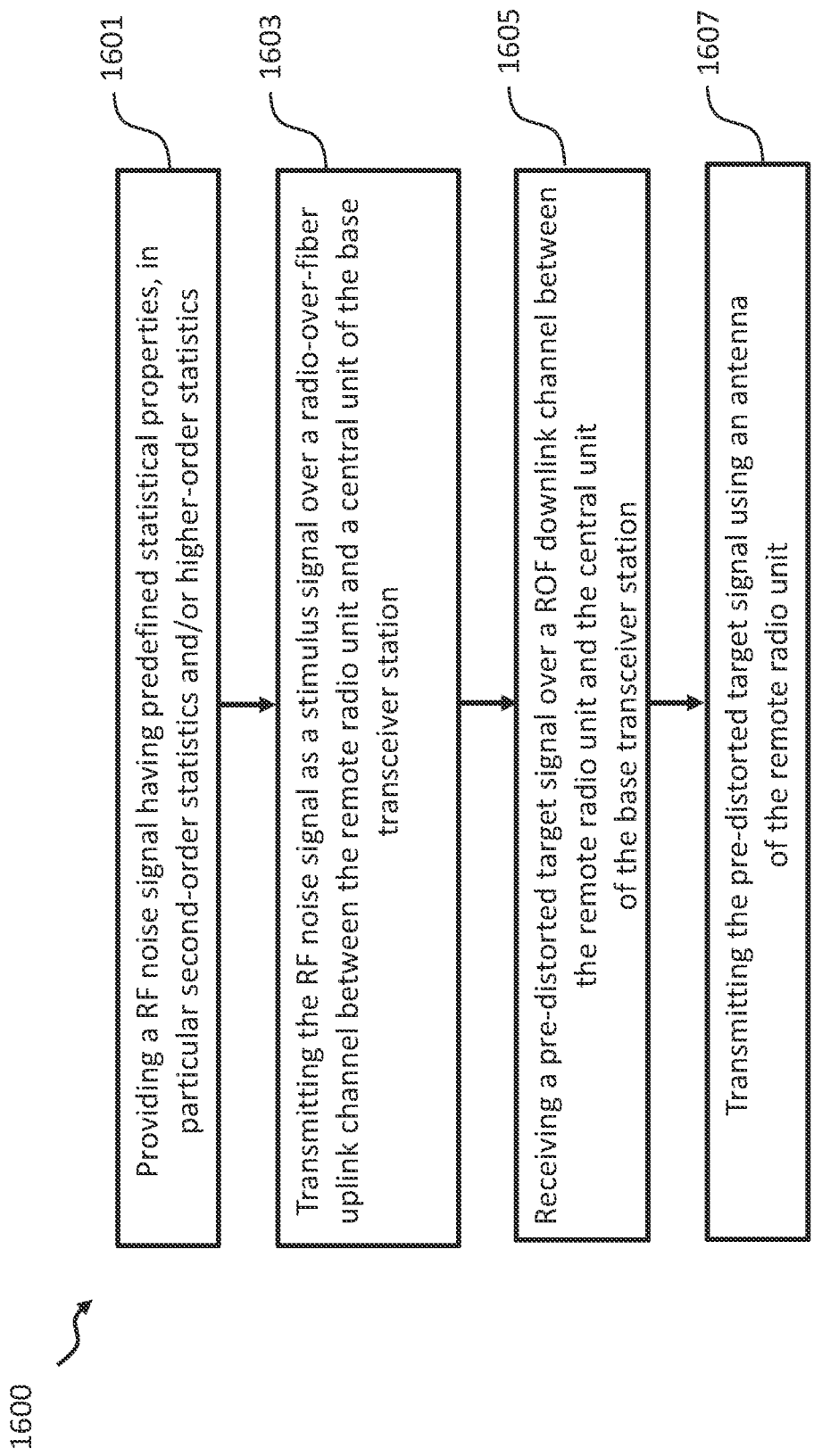
FIG. 16 shows a schematic diagram illustrating a method of operating a remote radio unit according to an embodiment of the present disclosure.

FIG. 16 shows a flow diagram illustrating a method 1600 of operating the remote radio unit 510 of the base transceiver station 500. The method 1600 comprises the steps of: providing 1601 a RF noise signal having predefined statistical properties, in particular second-order statistics and/or higher-order statistics; transmitting 1603 the RF noise signal as a stimulus signal over the radio-over-fiber uplink channel 520b between the remote radio unit 510 and the central unit 530 of the base transceiver station 500 for determining on the basis of the RF noise signal a pre-distortion of the target signal to be transmitted by the remote radio unit 510; receiving 1605 the pre-distorted target signal over the ROF downlink channel 520a between the remote radio unit 510 and the central unit 530 of the base transceiver station 500; and transmitting 1607 the pre-distorted target signal using the antenna 515 of the remote radio unit 510.

Figure 17:
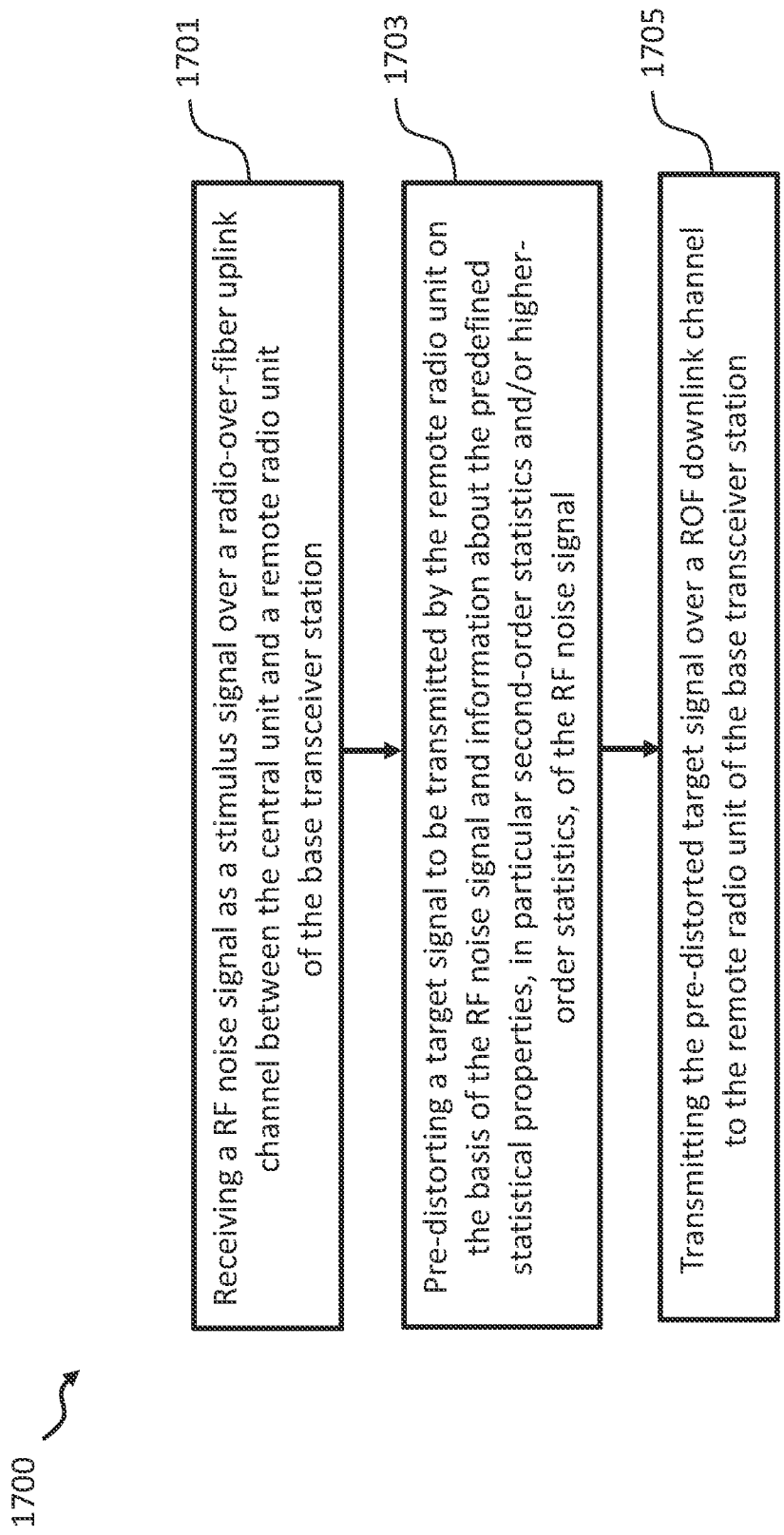
FIG. 17 shows a schematic diagram illustrating a method of operating a central unit according to an embodiment of the present disclosure.

FIG. 17 shows a flow diagram illustrating a method 1700 of operating the central unit 530 of the base transceiver station 500. The method 1700 comprises the steps of: receiving 1701 a RF noise signal as a stimulus signal over the radio-over-fiber uplink channel 520b between the central unit 530 and the remote radio unit 510 of the base transceiver station 500; pre-distorting 1703 a target signal to be transmitted by the remote radio unit 510 on the basis of the RF noise signal and information about the predefined statistical properties, in particular second-order statistics and/or higher-order statistics, of the RF noise signal; and transmitting 1705 the pre-distorted target signal over a ROF downlink channel 520a to the remote radio unit 510 of the base transceiver station 500.

While a particular feature or aspect of the disclosure may have been disclosed with respect to only one of several implementations or embodiments, such a feature or aspect may be combined with one or more further features or aspects of the other implementations or embodiments as may be desired or advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives thereof may have been used. It should be understood that these terms may have been used to indicate that two elements cooperate or interact with each other regardless whether they are in direct physical or electrical contact, or they are not in direct contact with each other.

Although exemplary aspects have been illustrated and described herein, it will be appreciated that a variety of alternate and/or equivalent implementations may be substituted for the exemplary aspects shown and described without departing from the scope of the present disclosure. This application is intended to cover any adaptations or variations of the exemplary aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the invention may be practiced otherwise than as specifically described herein.

What is claimed is:

1. A remote radio unit for a base transceiver station, wherein the remote radio unit comprises:

a noise generator configured to provide a radio-frequency (RF) noise signal having predefined statistical properties;
  a communication interface configured to transmit, to a central unit of the base transceiver station, the RF noise signal, received from the noise generator, as a stimulus signal over a radio-over-fiber (ROF) uplink channel between the remote radio unit and the central unit of the base transceiver station, wherein the communication interface is further configured to receive from the central unit a pre-distorted target signal over a ROF downlink channel between the remote radio unit and the central unit of the base transceiver station, wherein the pre-distorted target signal is generated based on the RF noise signal; and
  an antenna for transmitting the pre-distorted target signal received by the communication interface.

2. The remote radio unit of claim 1, wherein the noise generator is configured to provide the RF noise signal as a RF white noise signal having predefined statistical properties.

3. The remote radio unit of claim 1, wherein the remote radio unit further comprises a power amplifier configured to amplify the pre-distorted target signal received by the communication interface.

4. The remote radio unit of claim 1, wherein the remote radio unit further comprises a coupler configured to couple a ROF downlink channel processing chain of the remote radio unit to a ROF uplink channel processing chain of the remote radio unit.

5. The remote radio unit of claim 4, wherein the remote radio unit further comprises a controller configured to provide a control signal for triggering the noise generator to provide the RF noise signal.

6. The remote radio unit of claim 1, wherein the remote radio unit further comprises a power splitter configured to split the stimulus signal into a first stimulus signal and a second stimulus signal, wherein the communication interface is configured to transmit the first stimulus signal over the ROF uplink channel between the remote radio unit and the central unit of the base transceiver station and to transmit the second stimulus signal over a further ROF uplink channel between the remote radio unit and the central unit of the base transceiver station.

7. The remote radio unit of claim 6, wherein the remote radio unit further comprises a first local power control unit configured to control power of the first stimulus signal to be transmitted over the ROF uplink channel between the remote radio unit and the central unit of the base transceiver station and a second local power control unit configured to control power of the second stimulus signal to be transmitted over the further ROF uplink channel between the remote radio unit and the central unit of the base transceiver station.

8. The remote radio unit of claim 6, wherein the remote radio unit further comprises a global power controller configured to control power of the first stimulus signal and the second stimulus signal by implementing an uplink ROF power control loop.

9. The remote radio unit of claim 8, wherein the communication interface is configured to receive a desired target gain from the central unit and the global power controller is configured to control the power of the first stimulus signal and the second stimulus signal by implementing the uplink ROF power control loop on the basis of the desired target gain.

10. The remote radio unit of claim 9, wherein the communication interface is further configured to receive a control signal from the central unit of the base transceiver station for triggering the noise generator to provide the RF noise signal.

11. A central unit for a base transceiver station, wherein the central unit comprises:
- a communication interface configured to receive, from a remote radio unit of the base transceiver station, a RF noise signal as a stimulus signal over a radio-over-fiber (ROF) uplink channel between the central unit and the remote radio unit of the base transceiver station; and
- a pre-distortion unit configured to pre-distort a target signal to be transmitted by the remote radio unit based on the RF noise signal received by the communication interface;
- wherein the communication interface is further configured to transmit the pre-distorted target signal over a ROF downlink channel to the remote radio unit of the base transceiver station.

12. The central unit of claim 11, wherein the pre-distortion unit is configured to pre-distort the target signal to be transmitted by the remote radio unit based on the RF noise signal received by the communication interface using a blind channel identification algorithm.

13. The central unit of claim 12, wherein the blind channel identification algorithm is a constant modulus algorithm.

14. The central unit of claim 13, wherein the central unit further comprises a control unit configured to provide a control signal, and wherein the communication interface is further configured to transmit the control signal to the remote radio unit for triggering a noise generator of the remote radio unit to provide the RF noise signal.

15. The central unit of claim 14, wherein the central unit further comprises an analog-to-digital converter or a digital-to-analog converter, and wherein the pre-distortion unit is configured to pre-distort the target signal in the digital domain.

16. A method of operating a remote radio unit of a base transceiver station, wherein the method comprises:
- providing a RF noise signal having predefined statistical properties;
- transmitting the RF noise signal as a stimulus signal over a radio-over-fiber (ROF) uplink channel between the remote radio unit and a central unit of the base transceiver station;
- receiving a pre-distorted target signal over a ROF downlink channel between the remote radio unit and the central unit of the base transceiver station, wherein the pre-distorted target signal is generated based on the RF noise signal; and
- transmitting the pre-distorted target signal using an antenna of the remote radio unit.

* * * * *